B. H. AYLWORTH.
MANIKIN FOR ILLUSTRATING PRACTICE OF OBSTETRICS.

No. 88,432. Patented Mar. 30, 1869.

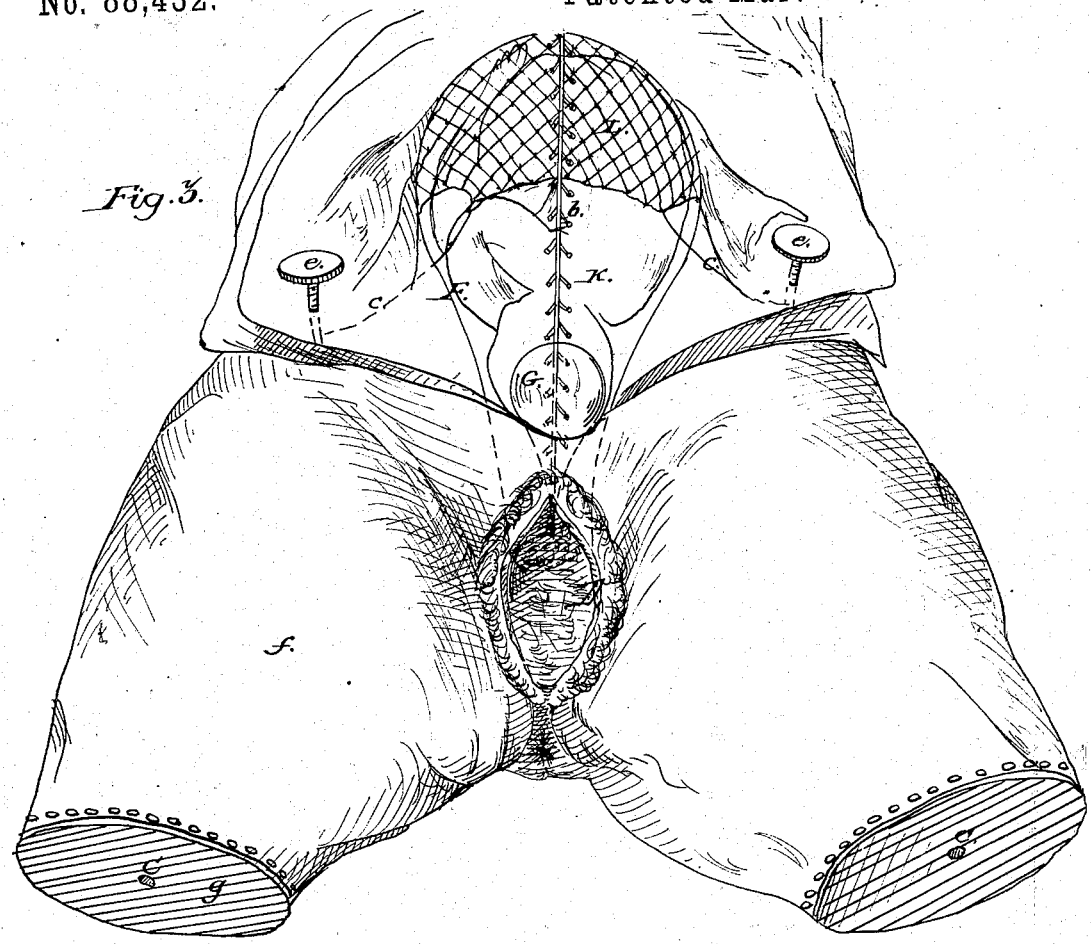
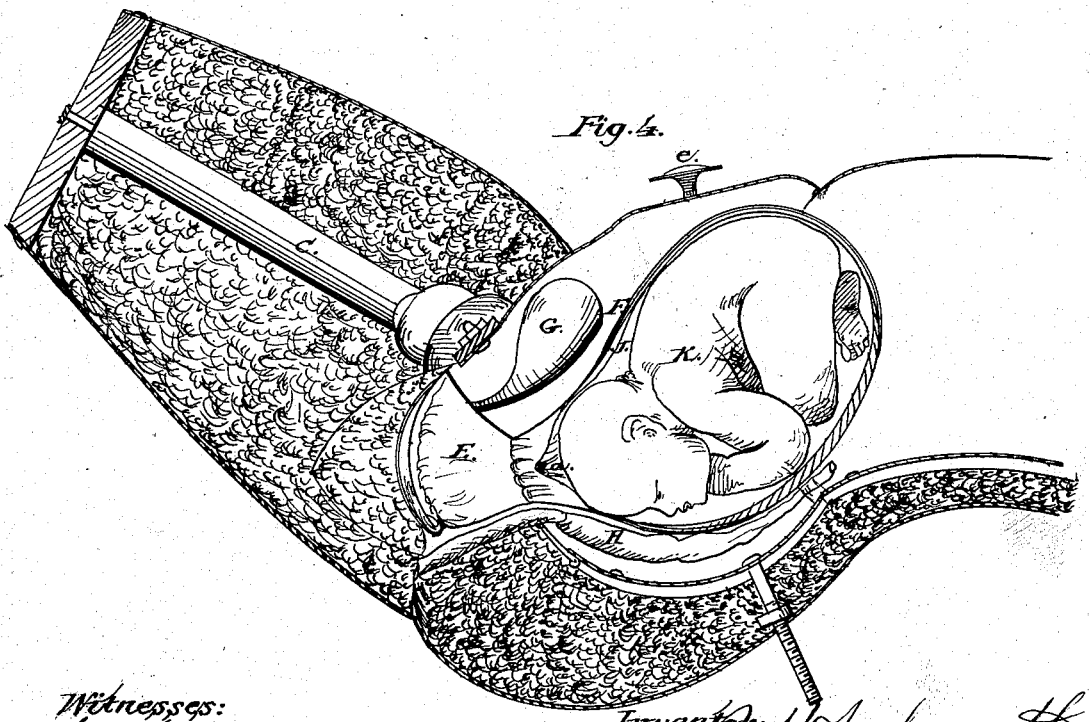

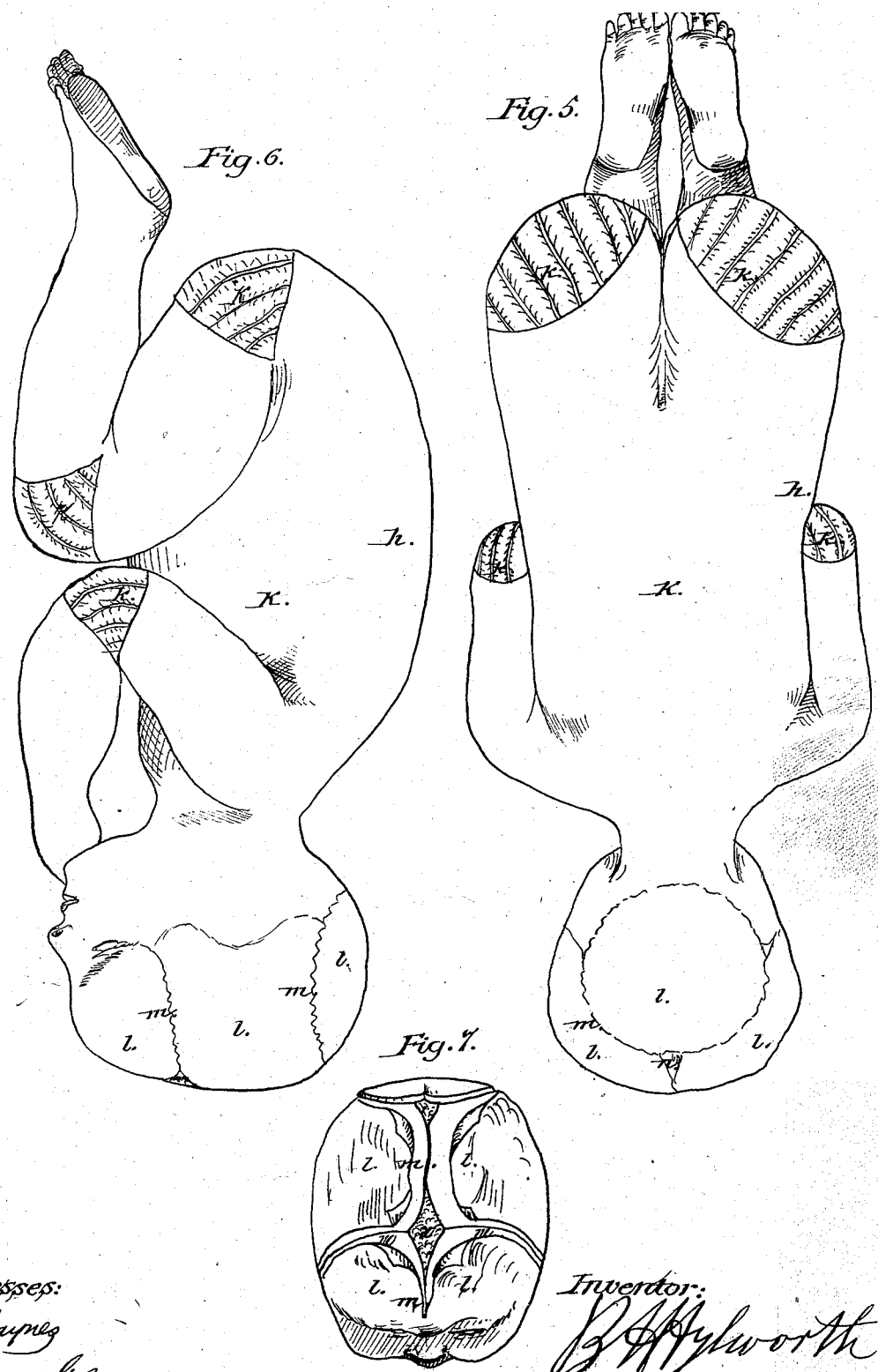

United States Patent Office.

B. H. AYLWORTH, OF OXFORD, NEW YORK.

*Letters Patent No. 88,432, dated March 30, 1869.*

MANIKIN, WITH FŒTUS, &c., FOR ILLUSTRATING THE PRACTICE OF OBSTETRICS.

The Schedule referred to in these Letters Patent and making part of the same.

*To all whom it may concern:*

Be it known that I, B. H. AYLWORTH, of Oxford, in the county of Chenango, and State of New York, have invented a new and useful Manikin, with Artificial Fœtus, for Illustrating the Practice of Obstetrics, of which the following is a full, clear, and exact description, reference being had to the accompanying drawing, forming part of this specification, and in which—

Figure 1 represents a view of a manikin, in part, showing the portion of a skeleton, in illustration of the human pelvis, with certain attachments or pertaining parts.

Figure 2, an outside view of a portion of one of the innominenta, in part, of the manikin, with a mechanical device secured thereto, to aid in showing the natural contractile force of the uterus.

Figure 3 is a front view of the portion of the manikin used to illustrate the practice of obstetrics, according to this, my invention, showing the skeleton covered and complete.

Figure 4 is an irregular vertical section of the same, taken through the uterus, with an artificial fœtus therein.

Figure 5 represents a back view, on an enlarged scale, of said fœtus, as constructed to illustrate my invention, and Figure 6, a side view of the same.

Figure 7 is a top view of the skull thereof, with its sutures.

Similar letters of reference indicate corresponding parts in the several figures.

Figure 1:
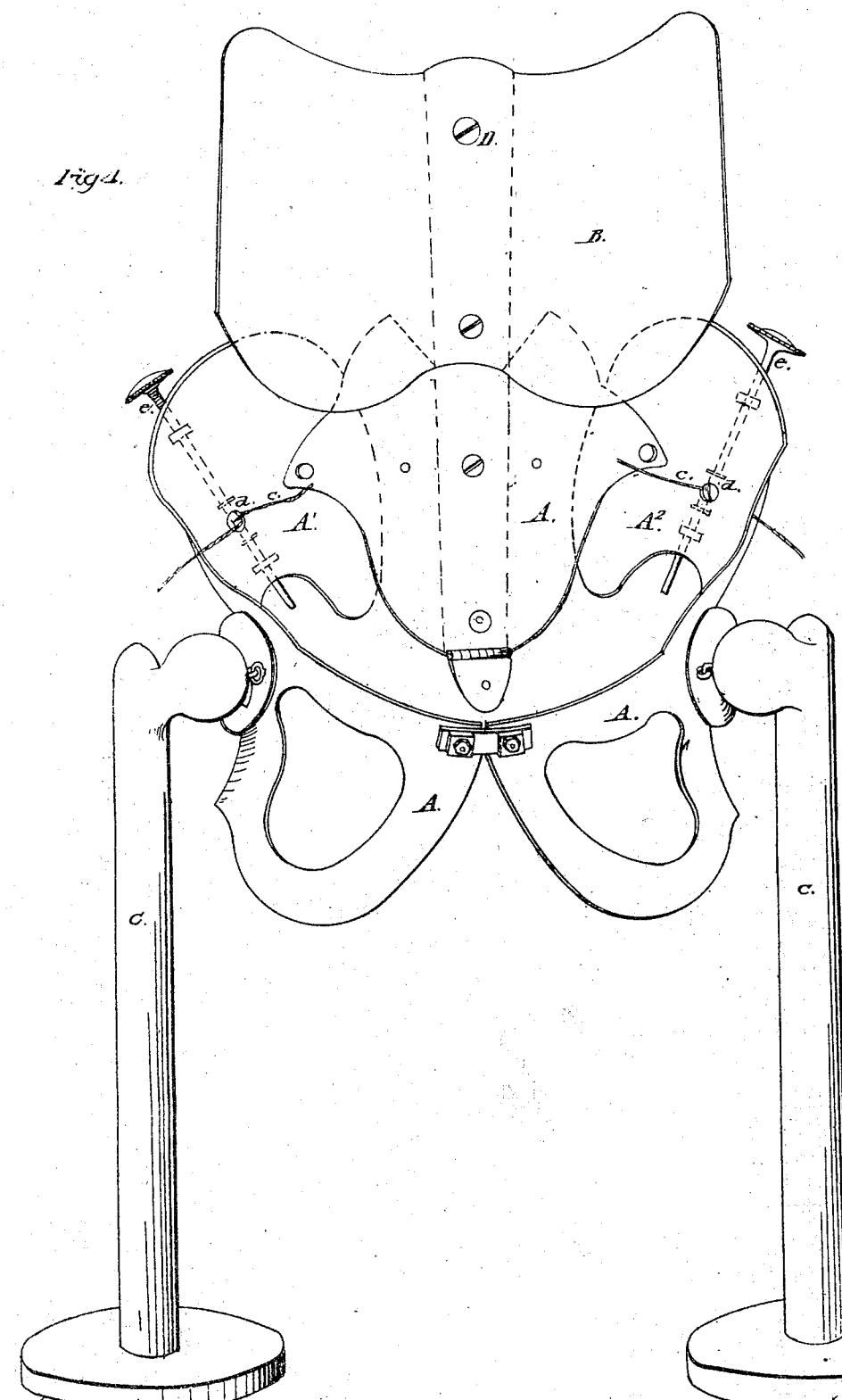
Figure 2:
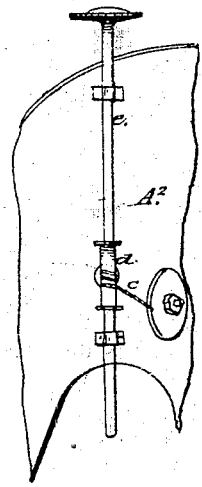

The object of this, my invention, is to illustrate, by means of a manikin, of a novel and operative character, or construction, with artificial fœtus combined, the science and practice of obstetrics, for the instruction of medical students and others.

This manikin comprises that portion of the human female which is immediately connected with child-bearing, and certain adjacent parts, or organs; also a fœtus within the uterus, and made capable of extraction, or expulsion therefrom; the whole being so constructed as to illustrate the various manipulations practised in natural and instrumental labor.

Referring to the accompanying drawings—

A A¹ A² are metal plates, representing the solid parts, or bones of the female pelvis, connected, in any suitable manner, to represent natural articulation.

B is the anterior surface of the posterior wall of the abdomen.

C C, portions of the femurs.

The external organs of generation, such as the labia D D, also the internal organs, such as the vagina E, the uterus F, and its appendages, likewise the placenta and chorion J, the bladder G, the rectum H, and anus I, are all made of elastic India rubber, and located in their proper relative positions.

The placenta and chorion J, into which the artificial fœtus K is placed, may be inflated, by means of a tube, $a$, provided with a suitable stop-cock, such inflation representing the liquor-amnii.

The uterus F may then be closed, by lacing $b$, or otherwise, and the fœtus manipulated, as in natural labor.

After this, the chorion J may be opened, and the artificial fœtus caused to descend, which is facilitated by employing a mesh, or net-work, L, of thread, or other suitable material, covering the fundus of the uterus, and made to assist in illustrating the contractile and expulsive force of the uterus, by means of cords $c\ c$, passing through holes in the ilium, and operated, by pulleys $d\ d$, through shafts and finger-disks $e\ e$. Then the various presentations of the fœtus may be studied successfully, with the various manipulations of turning, and application or use of different kinds of instruments.

The bladder G may be inflated, by means of a tube, provided with a stop-cock, for the purpose of showing its relation to other organs, and the danger of injury to it in natural or instrumental labor; and by allowing it to collapse, or contract, through escape of the air used for its inflation, showing the importance of keeping said organ well emptied, to obviate such danger.

The whole structure is covered with non-elastic or semi-elastic rubber cloth $f$, and stuffed with rubber, sponge, curled hair, or other elastic material, $g$, to represent the fleshy and muscular tissues of living parturient females, or that portion of the abdomen and limbs necessary for the purpose for which the manikin is designed.

The artificial fœtus K, which may be made of life-size at birth, is formed, for the most part, of semi-elastic rubber cloth $h$, stuffed with rubber, sponge, or other elastic material, to represent the natural fœtus, the same being made with a spine, $i$, of semi-elastic rubber, to show the different movements of which the fœtus is susceptible, and metallic or rubber parts, representing the other bones and joints of the fœtus, the joints, or certain of them, $k$, having elastic rubber inserted, to illustrate the natural extension and flexion of the parts in a living fœtus, whereby said artificial fœtus is made to assume its natural position in the uterus, with a capacity to straighten, when unrestrained, and delivered therefrom.

The skull of said fœtus is made of metallic plates $l$, to represent the bones of the natural skull, with its sutures $m$, and fontanelles $n$, such divided portions being covered by elastic rubber, to hold them together, and to admit of the compressibility of the head, as in the natural fœtus, said head being filled with rubber, sponge, or other elastic material. This construction admits of the manipulation of the fœtus, as in natural or instrumental labor.

A manikin, with artificial fœtus combined, thus constructed, is not merely of an anatomical character, but operative in its action, and serves to practically illustrate the art of midwifery, either with or without the use of instruments.

The operation of the manikin will be facilitated by the introduction of powdered soapstone, or French chalk, which acts as a lubricator.

What is here claimed, and desired to be secured by Letters Patent, is—

1. A manikin, constructed to exhibit, in an operative manner, by providing, in the various organs illustrated, for movements representing their natural action, the science and practice of obstetrics, substantially as specified.

2. The covering L to the artificial uterus, operated, from the exterior of the manikin, by cords and pulleys, or other suitable mechanical devices, to assist in illustrating the expulsive action of said uterus, essentially as described.

3. An artificial fœtus, constructed substantially as described, with its joints k made capable of extension and flexion, to secure to it its natural position in the uterus, and so that said jointed portions extend automatically, when withdrawn therefrom, substantially as specified.

4. An artificial fœtus, with its skull, constructed substantially as described, and made compressible, essentially as and for the purpose or purposes herein set forth.

B. H. AYLWORTH.

Witnesses:
FRED. HAYNES,
HENRY PALMER.